May 5, 1964 C. D. GABOR ETAL 3,131,463

AUTOMATIC BRICK LOADER

Filed Feb. 21, 1963 7 Sheets-Sheet 1

INVENTOR.
CHARLES D. GABOR,
RICHARD O. PLATT,
JOHN M. O'DONNELL &
THOMAS W. LLOYD
BY William C. Neolon
ATTORNEY May 5, 1964 C. D. GABOR ETAL 3,131,463

AUTOMATIC BRICK LOADER

Filed Feb. 21, 1963 7 Sheets-Sheet 2

INVENTORS
CHARLES D. GABOR,
RICHARD O. PLATT,
BY JOHN M. O'DONNELL &
THOMAS W. LLOYD

William C. Nealon
ATTORNEY

May 5, 1964

C. D. GABOR ETAL 3,131,463

AUTOMATIC BRICK LOADER

Filed Feb. 21, 1963

7 Sheets-Sheet 3

INVENTORS
CHARLES D. GABOR,
RICHARD O. PLATT,
BY JOHN M. O'DONNELL &
THOMAS W. LLOYD

William C. Nealon
ATTORNEY

INVENTORS
CHARLES D. GABOR,
RICHARD O. PLATT,
JOHN M. O'DONNELL &
THOMAS W. LLOYD
BY William C. Nealon
ATTORNEY INVENTORS
CHARLES D. GABOR,
RICHARD O. PLATT,
BY JOHN M. O'DONNELL &
THOMAS W. LLOYD
William C. Nealon
ATTORNEY INVENTORS
CHARLES D. GABOR,
RICHARD O. PLATT,
BY JOHN M. O'DONNELL &
THOMAS W. LLOYD
William C. Nealon
ATTORNEY INVENTORS
CHARLES D. GABOR,
RICHARD O. PLATT,
JOHN M. O'DONNELL &
THOMAS W. LLOYD
BY William C. Nealon
ATTORNEY 3,131,463
Patented May 5, 1964

3,131,463

AUTOMATIC BRICK LOADER

Charles D. Gabor, Verona, Richard O. Platt, Bethel Park, and John M. O'Donnell, Pittsburgh, Pa., and Thomas W. Lloyd, Glen Burnie, Md., assignors to Harbison-Walker Refractories Company, Pittsburgh, Pa., a corporation of Pennsylvania Filed Feb. 21, 1963, Ser. No. 261,246
20 Claims. (Cl. 29—200)

This invention relates to applying cases to brick. More particularly, it relates to method and apparatus for applying channel shaped metal cases to refractory brick.

For some industrial furnaces, it is desirable to use refractory brick which are metal encased. In the past, it has been common practice to use U-shaped cases and to spread the case flanges apart by hand during application to brick. This, of course, is time consuming and difficult, and there is danger of injury to workmen handling the metal cases and brick.

Various machines have been suggested for automatically applying metal cases to brick. For example, the apparatus disclosed in United States Patent 2,682,703, which is owned by the assignee of the present invention, has been used for automatically applying metal cases to brick. This patent discloses apparatus for placing a single U-shaped channel about three faces of a rectangular refractory brick.

Improved casing techniques call for placing a pair of opposed U-shaped channels about brick, so that the four long faces thereof are covered with an oxidizable metal sheath; and, it is among the objects of this invention to provide method and apparatus for automatically doing this. It is another object of the invention to provide apparatus which automatically feeds brick and empty cases to a casing station, opens the cases, places brick in the open cases, closes the cases and discharges a cased brick from the apparatus, all without manual interruption.

Briefly, in one embodiment, apparatus for the practice of the method of this invention includes a brick stop and feed station, which further includes means arranged to continuously remove the first from a series of brick to be cased and pass it to a juxtaposed brick load station. There is guide means cooperatively interconnecting the stop and feed station and the load station arranged to guide brick from the stop and feed station to the load station. There is means at the load station arranged to pass a brick therefrom to a juxtaposed casing station. There is guide means cooperatively interconnecting the load station and the casing station arranged to guide a brick from the load station to the casing station. An empty case supply and feed station, adjacent the casing station, includes means arranged to continuously remove a first from a series of empty cases and to pass it over guide means to the casing station. There is means at the casing station arranged to open a case and to guide a brick into the opened case. The casing station further includes means arranged to close a case about a contained brick. There is pusher means mounted between the empty case supply and feed station and the casing station. The pusher means is arranged for reciprocal travel from a first position between the case supply and feed station and the casing station to a second position remote from said casing station. In its travel from its first to its second position, the pusher means removes a cased brick from the casing station. There is an integrated control system arranged to sequentially and automatically actuate and stop the functions of the various working parts of the apparatus.

A better understanding, and other features and advantages of method and apparatus according to this invention will be readily apparent to those skilled in the art from a study of the following detailed description, with reference to the drawings. In these drawings.

GENERAL

Figure 1:
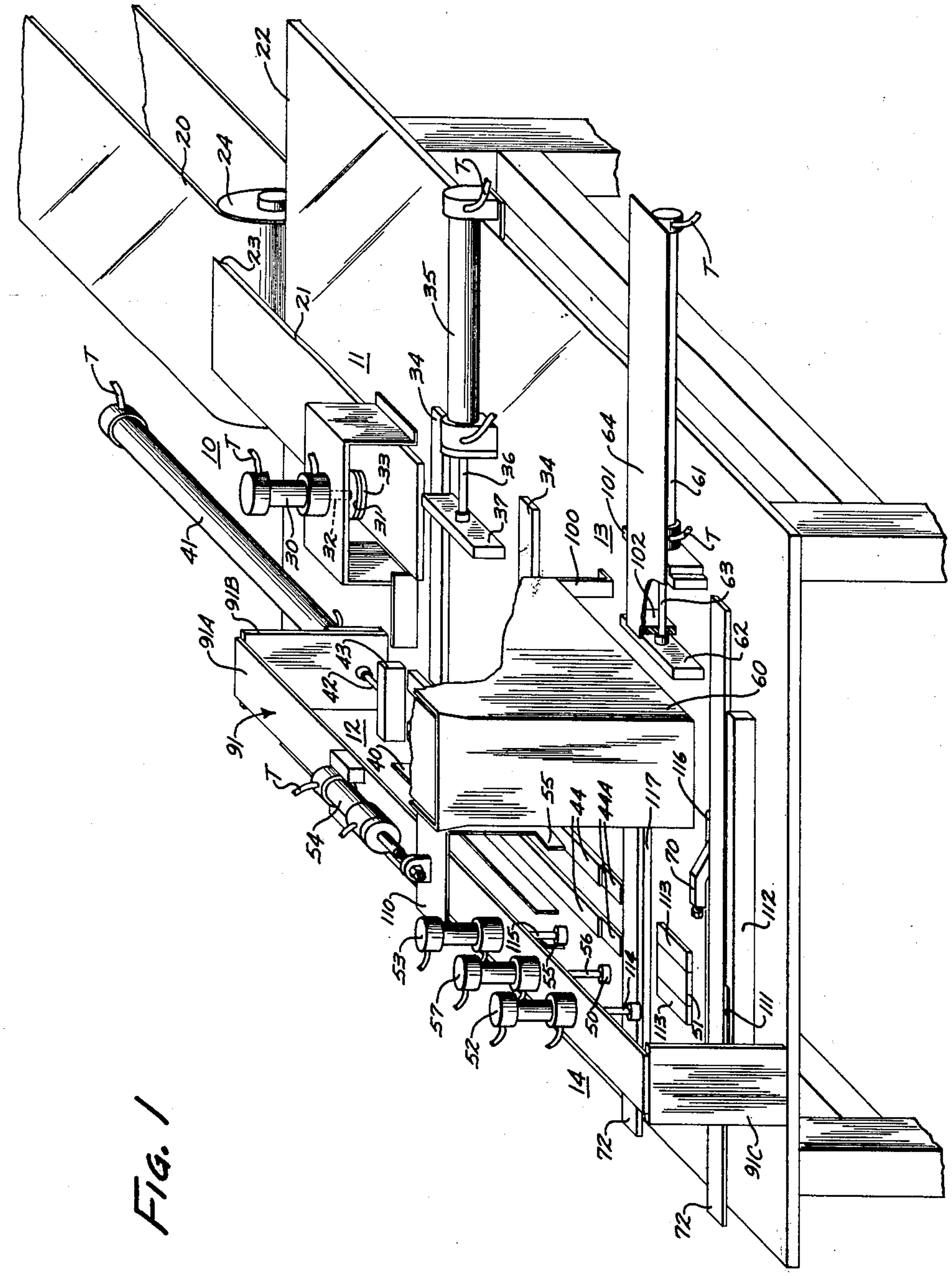
FIG. 1 is a schematic, isometric view, partially broken away and with some parts omitted, to better show internal arrangement of parts of apparatus according to the invention.

Apparatus for performance of the method of this invention, in one aspect, can be broadly characterized as comprised of five manipulating stations. These stations include a brick supply station 10, a brick stop and feed station 11, a brick load station 12, an empty case supply and feed station 13, and a casing station 14.

The brick supply station 10 is comprised of a conveyor 20, and the brick transfer plate 21 which is fixed at one end (as by welding or bolting) to table 22 and which just extends over conveyor 20 at its other end 23. The end 23 preferably includes a knife edge spaced closely adjacent the upper stretch of the conveyor 20, where it turns about its end pulley 24 in a position to easily slip under the leading edge of a brick moving forward under the influence of the conveyor.

The brick stop and feed station 11 includes a brick clamp hydraulic cylinder 30 having a flat plate 31 fixed at the end of its movable rod 32. The plate 31 has a rubber pad 33 secured to its lower surface. The function of cylinder 30 and its padded plate is to hold a brick in place while a preceding brick is in position on the wear strips or guide runners 34. This latter brick is thus free to be pushed over into the brick load station 12 by the brick transfer hydraulic cylinder 35. The forward end of the brick transfer cylinder rod 36 has an elongated pad 37 to facilitate movement of a brick in front of it.

In the brick load station 12, the metal strip or wall 40 limits the sideways travel of a brick moving under the influence transfer cylinder 35. The brick load hydraulic cylinder 41, through its rod 42 and its elongated pad 43 is arranged to push a brick along the guide runners 44 into the casing station 14.

The casing station 14 includes upper and lower permanent magnetic members 50 and 51, which open a metal case in position between them to receive a brick moving down from the load station 12. The magnetic member 50 is movable with rod 56 upon activation of hydraulic cylinder 57. Spaced cylinders 52 and 53 cause stripping of the upper section of a metal case from the magnetic member 51 after a brick has been loaded. Another hydraulic cylinder 54, through its forwardly movable, inwardly bent, fingers 55, is arranged to guide a brick into an open case.

Figure 2:
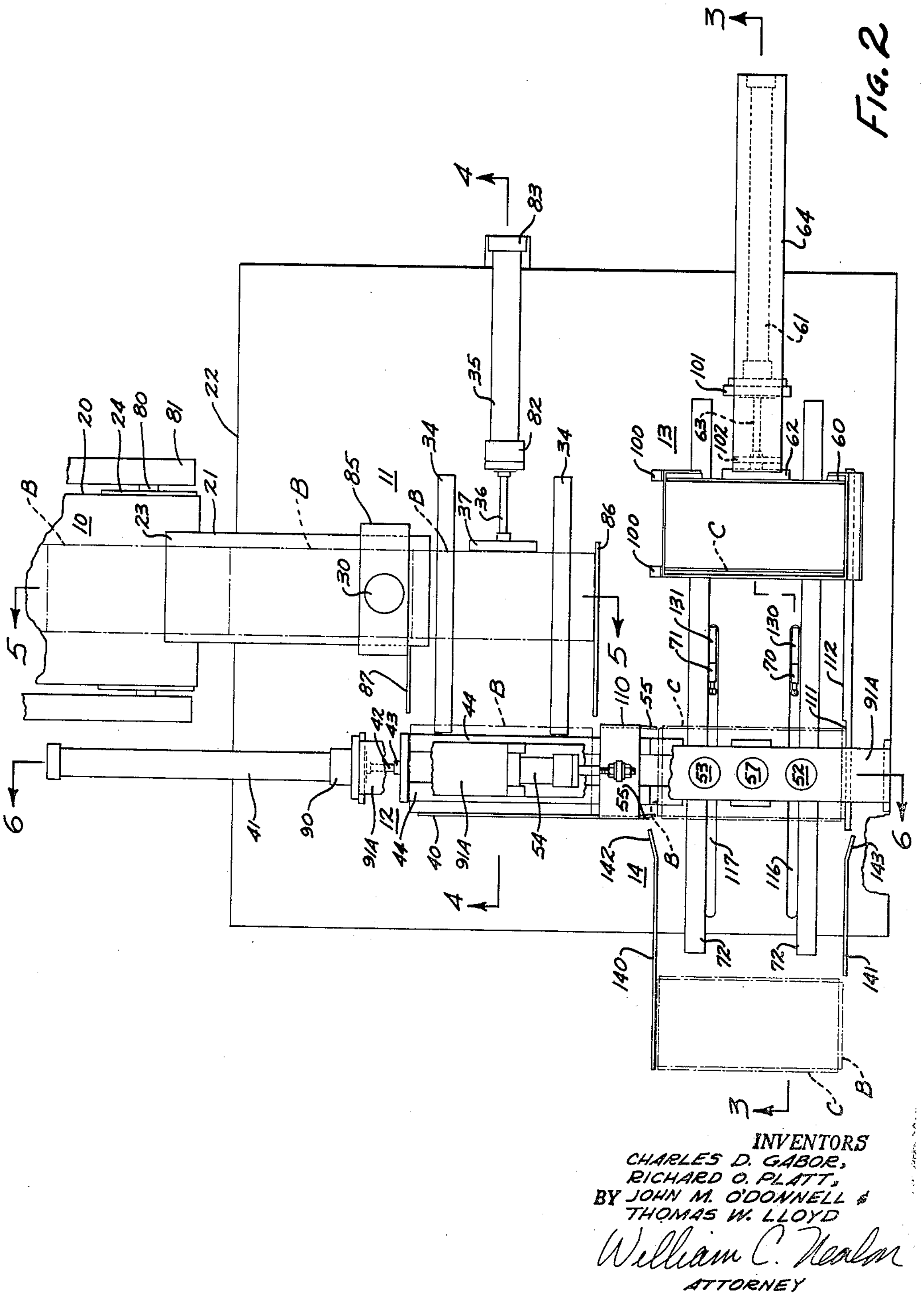
FIG. 2 is a top elevation of apparatus of the type shown in FIG. 1.

The case supply and feed station 13 includes a magazine 60, which carries a stack of empty cases in position for single removal by the case transfer hydraulic cylinder 61. The cylinder 61 has an elongated pad 62 mounted on the forward end of its rod 63 to facilitate movement of a case to the casing station 14. The plate 64 moves with rod 63 and prevents subsequent cases in the magazine from dropping. Reciprocally movable pushers 70 and 71 (the pair are best seen in FIG. 2), which travel from one side of the casing station to the other side, are arranged to remove a cased brick from the casing station over the guide rails 72.

In the various drawings, and in the discussion which follows, brick are identified by the letter B, and cases by the letter C.

*The Brick Supply Station*

The brick supply station is comprised of an endless flexible conveyor 20, preferably fabricated of a cord-reinforced rubber-like material. The end pulley 24 is mounted on shafts 80, journaled within spaced housings 81. The forward end 23 of sheet metal plate 21 is rearwardly biased so the upper surface thereof may be positioned closely adjacent the upper surface of conveyor 20. The other end of the plate 21 terminates short of the guide rails 34, which interconnect the brick stop and feed station 11 and the brick load station 12. The thickness of the plate 21 is preferably substantially the same as the heighth of the guide rails 34, although it may be somewhat thicker. A plurality of brick B are aligned on the conveyor 20. The conveyor 20 moves the aligned brick forwardly through frictional engagement. Even when the aligned brick are held motionless by the brick clamp cylinder 30, the conveyor continues to move. Thus, when the brick clamp cylinder 30 releases the most forward of the aligned brick, the conveyor 20 immediately causes the series of aligned brick to move forward.

*Brick Stop And Feed Station*

Transfer cylinder 35 is supported on the table 22 by spaced supports 82 and 83. Its pad 37 is preferably threadedly engaged on the forward end of its rod 36. Such an arrangement allows easy substitution of pads 37, commensurate with wear or variation in size and material of the brick being handled.

The guide runners 34 are equi-spaced about the rod 36. The total distance between the guide rods 34 is less than the width of a brick to be handled. If desired, the guide runners 34 can be adjustable to allow reciprocal sidewise movement for variation in spacing. Alternatively or additionally, the guide plates or walls 86 and 87 can be adjustable.

Figure 4:
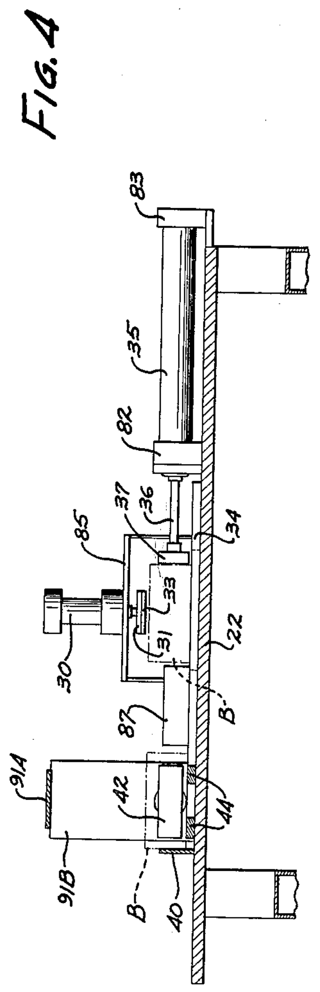
FIG. 4 is a side elevation in partial section taken along the line 4—4 of the arrangement of FIG. 2.
Figure 5:
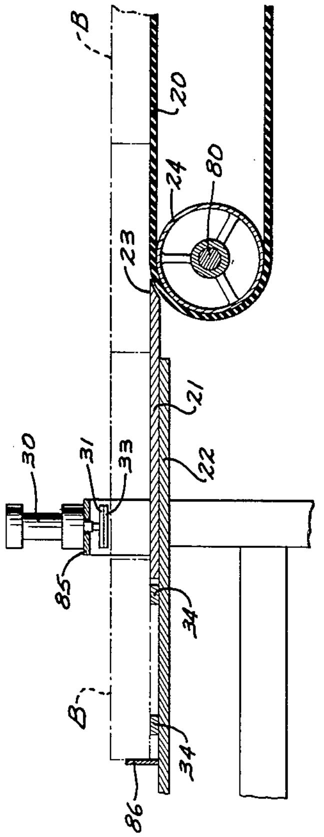
FIG. 5 is a schematic side elevation in partial section taken along the line 5—5 of the arrangement of FIG. 2.

The brick clamp cylinder 30 is mounted on the sheet metal bridge 85, which bridge straddles the plate 21. The brick clamp cylinder 30, as noted above, is arranged to hold the second of the series of aligned brick B, so the first brick may be moved by cylinder 35. The plate 86 faces the bridge 85 and is arranged to stop the forward movement of brick released by the clamp cylinder 30. A second plate 87 cooperates with parallel plate 86 for aligned movement of brick under the influence of cylinder 35. The plates 86 and 87, the bridge 85, the supports 82 and 83, and the guide runners 34 may be welded, bolted, or otherwise secured to the table 22. FIGS. 4 and 5 more clearly show the relative elevational relation between the parts which make up the brick stop and feed station 11 and the cooperation thereof with the brick supply station 10. Suitable flexible tubing T (shown only in FIG. 1 to maintain drawing simplicity) interconnect the cylinders 30, 35, and the various other cylinders hereafter and previously discussed, with a source of hydraulc fluid, air etc.

*The Brick Load Station*

Figure 3:
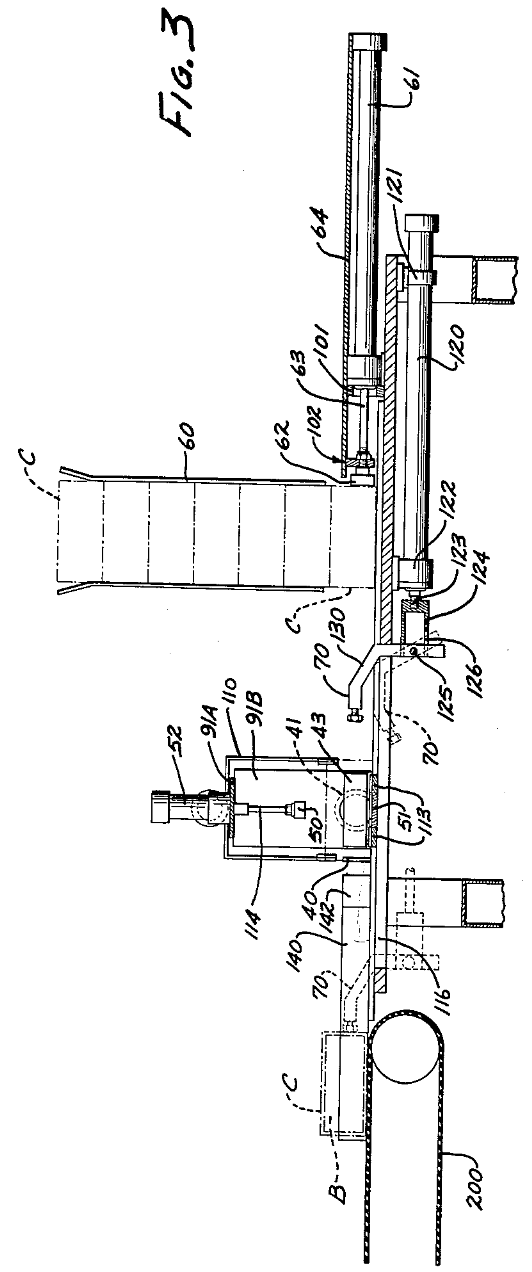
FIG. 3 is a side elevation in partial section taken along the line 3—3 of the arrangement of FIG. 2.

The brick load station 12 includes the cylinder 41, which is carried on the table 22 by support 90. The pad 43 is threadedly engaged on the forward end of the rod 42, to allow easy substitution of parts for the same reasons as discussed relative to pad 37. In its retracted position, pad 43 is to the rear of the forward face of the wall or plate 87 to assure no impedance to the travel of brick B over guide runners 34. The sidewise travel of brick B is ultimately limited by the wall 40. The wall 40 is so positioned as to assure a brick abutting thereagainst is carried on the spaced guide runners 44. (This arrangement is best seen in FIG. 3). The best view of bridge 91 which extends from the load station 12 to the casing station 14, is shown in FIG. 1. This bridge is comprised of a relatively long and narrow strip 91A supported at its respective opposite ends by endwalls 91B and 91C. The endwalls 91B and 91C are, of course, fixed as by welding, or the like, to table 22.

Figure 6:
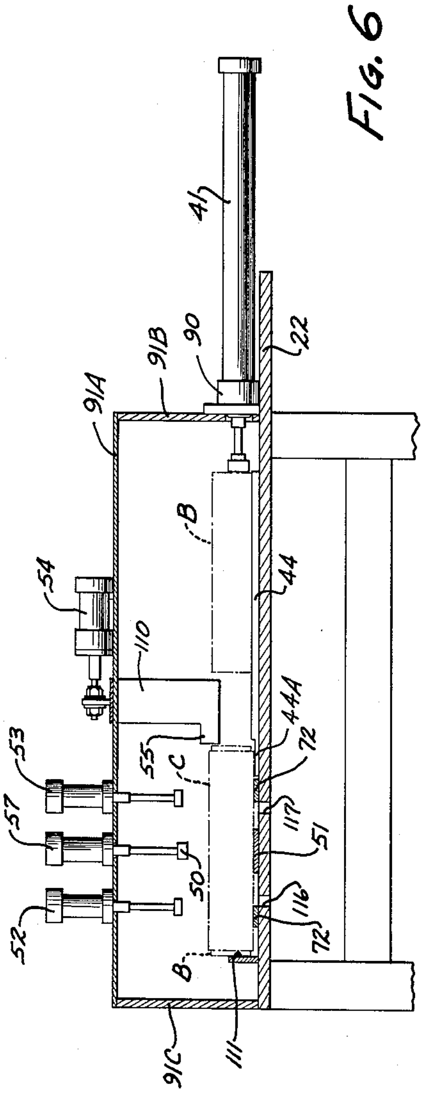
FIG. 6 is a schematic side elevation in partial section taken along the line 6—6 of the arrangement of FIG. 2.

The forward ends of the guide runners 44 include a lowered step portion 44A, which is best seen in FIGS. 1 and 6. The depth of this step is substantially equal to the thickness of the sheet metal from which the cases C are fabricated. This arrangement assures that brick B will not have their leading edge impeded by the peripheral lip of an opened case C as they are inserted.

*The Empty Case Supply And Feed Station*

The empty case supply and feed station 13 is shown positioned to the right of the casing station 14 and includes the magazine 60 which is arranged to hold a plurality of empty cases in position above the guide runners 72 which interconnect the feed and supply station 13 with the casing station 14. The magazine 60 is supported by such as angle irons 100. Of course, the bottom of magazine 60 must be spaced above the table surface a heighth at least equal to and preferably slightly greater than the heighth of an empty case.

The cylinder 61 is fixed in position on table 22 by its support 101. The support 101 has a flat upper surface and is relatively long to provide a bearing surface for the reciprocally movable plate 64.

The manner in which the plate 64 is moved is most clearly understood by reference to FIG. 3. An apertured wall 102 is affixed to the forward end of rod 63 to the rear of pad 62. Upon actuation of cylinder 61, the pad 62 starts the removal of the lowermost of the cases from magazine 60 and the plate 64 moves forward with the pad 62 and maintains subsequent cases in the magazine.

*The Casing Station*

The casing station 14 includes the pair of opposed permanent magnetic members 50 and 51 which are arranged to open a case. Once a case is opened, the cylinder 54 moves the yoke 110 forwardly in such a manner as to insert its inwardly bent fingers 55 within the opened case. The fingers then serve to guide a brick moving down to the casing station under the influence of cylinder 41 into the case. The stepped surface 111 of the wall 112 limits the travel of the brick moving under influence of cylinder 41. The surface 111 is stepped to assure that the leading surface of a brick passes completely through the case.

The blocks 113, positioned to each side of the magnetic member 51, provide an enlarged supporting surface for the case and brick during the casing operation. After the brick has been placed within the metal case, the stripping cylinders 52 and 53 are actuated, thereby extending their rods 114 and 115, respectively, to push the upper case section away from the magnet 50 and to assure a tight fit about a brick.

The pair of pushers 70 and 71 will, for purposes of explanation, be considered part of the casing station since they are the means which remove cased brick from the casing station and discharge them such as, for example, onto the conveyor 200 shown in FIG. 3. The pushers 70 and 71 are arranged for reciprocal travel through the elongated slots 116 and 117. These slots are wider than the thickness of the pushers. This is to allow depression of the pushers beneath the surface of the table 22, in the manner shown in dotted lines in FIG. 3. The pushers are movable under the influence of a cylinder such as cylinder 120 which is carried by supports 121 and 122 on the undersurface of table 22. The rod 123 of cylinder 120 threadedly engages the rear wall of cup 124. The pusher 70 is pivotally mounted on a pin 125 at the forward end of cup 124. There is a slot 126 formed through the lower surface of the cup 124, to allow the rearward pivotal movement of the bottom of the pusher 70 when it is depressed. The upper surface of the cup 124 is also slotted, but to a lesser depth than its lower surface, to provide a pocket for that portion of the pusher 70 above pin 125. Thus, a case C moving forwardly under the influence of pad 62, or positioned at the casing station, may contact the sloping surfaces 130 and 131 of the pushers 70 and 71 to depress them.

At the completion of a casing operation, the pushers 70 and 71 move forwardly into contact with the cased brick to move it onto adjacent conveyor 200. Preferably, a pair of parallel flanges 140 and 141 having outwardly diverging rear edges 142 and 143, respectively, assist the operation of the pushers 70 and 71 for aligned movement of cased brick from the casing station.

Figure 7A:
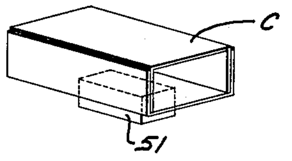
FIGS. 7A, 7B, 7C, 7D, 7E and 7F are schematic indications of sequential operations performed at the casing station by the apparatus of FIG. 2 in encasing a brick.
Figure 7B:
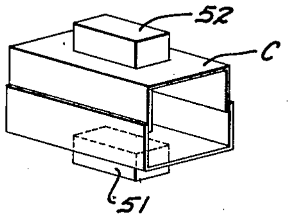
Figure 7C:
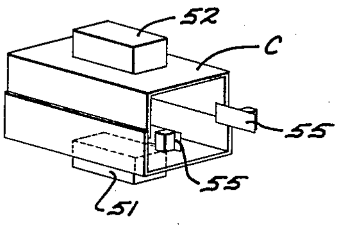
Figure 7D:
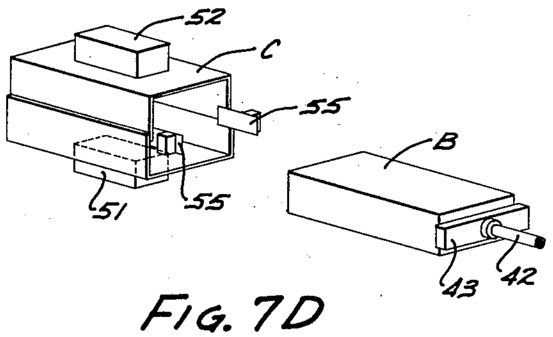
Figure 7E:
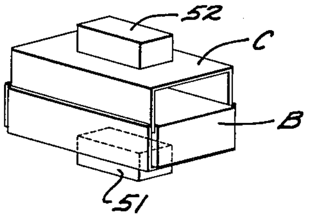
Figure 7F:
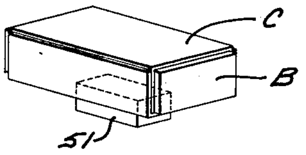

The sequential steps performed by the casing station are better understood by reference to FIGS. 7A through 7F. In FIG. 7A, a two-part metal case C having top and bottom opposed U-shaped sections, one of which fits into the other, are held in position by the magnetic member 51. In FIG. 7B, the upper magnetic member 52 attaches to the upper section of the case and lifts it to thereby open the case. Note, however, that the opposed lips of the two casing sections remain in contact. In FIG. 7C, the inwardly bent fingers 55 are moved into position to subsequently guide a brick B within the case. See FIG. 7D. When the brick B is within the open case, as shown in FIG. 7E, the upper case section is stripped from the magnetic member 52 to provide the finished cased brick shown in FIG. 7F.

*The Integrated Control System*

Figure 8:
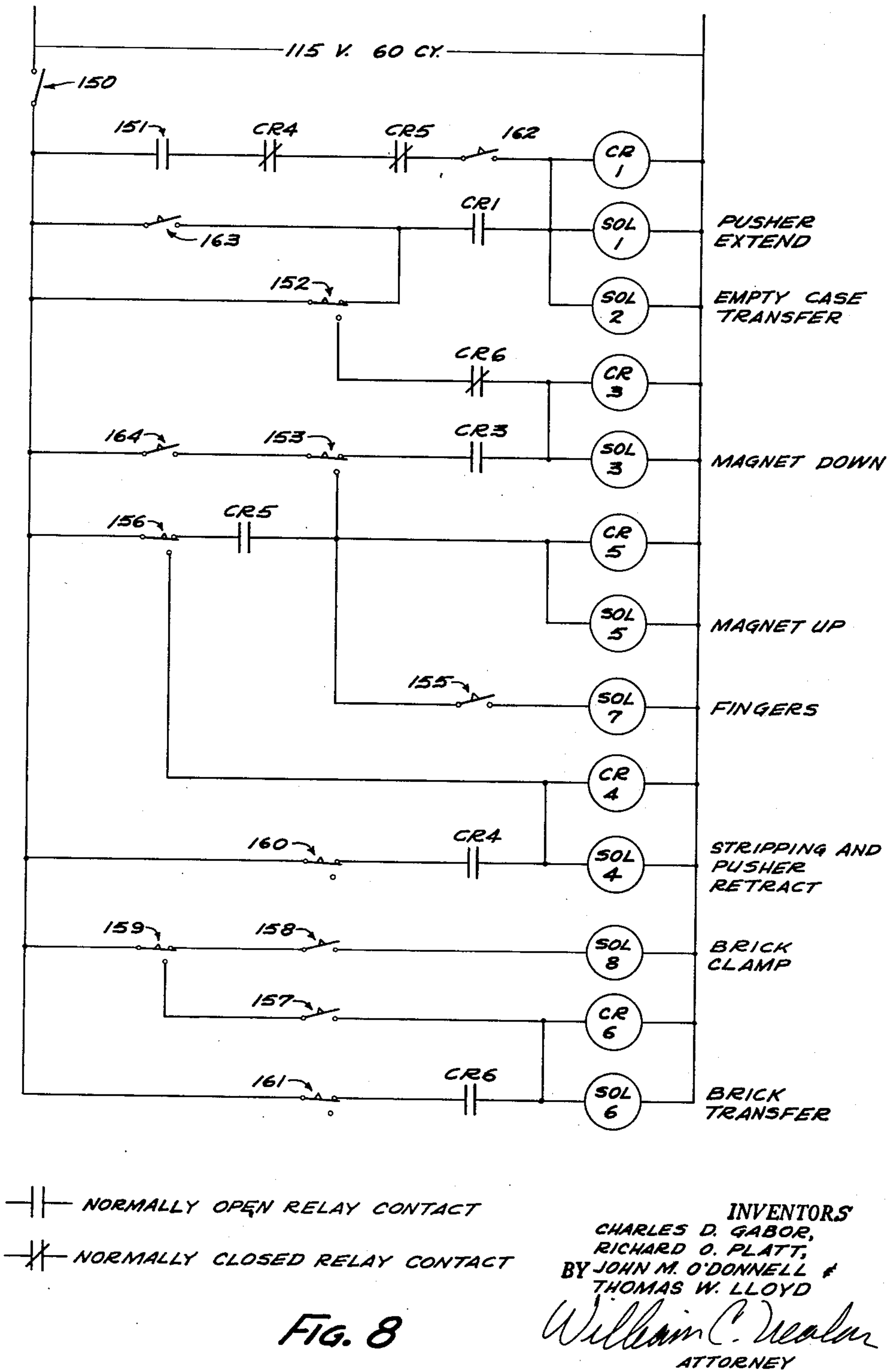
FIG. 8 is a schematic diagram of the integrated control system for operation of the apparatus of FIG. 1.
Figure 9:
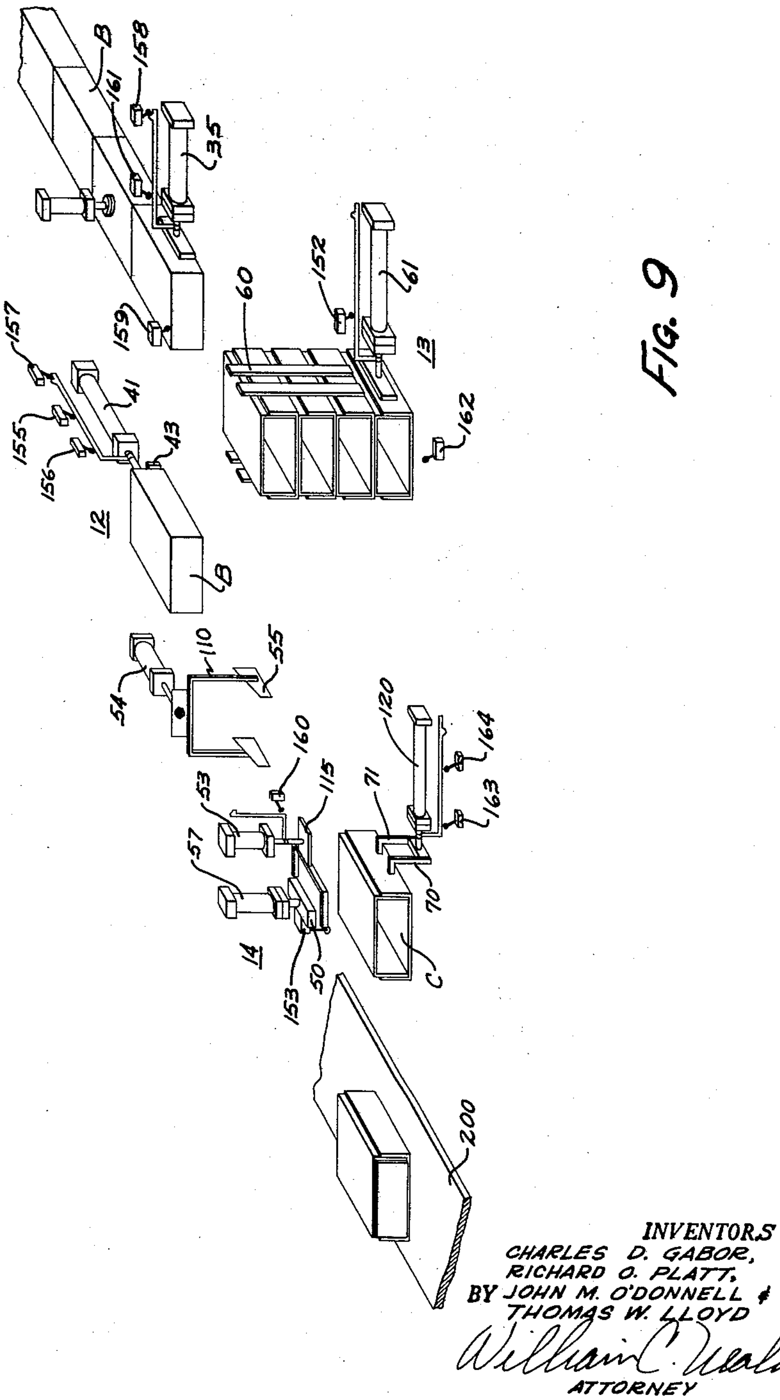
FIG. 9 is a simplified schematic rendering of the apparatus of FIG. 1, and the relative relation of parts thereof to the control system of FIG. 8.

The integrated control system is best understood by reference to FIGS. 8 and 9. In FIG. 9, portions of the arrangement of FIG. 8 are shown as they are positioned relative to components of the apparatus of FIGS. 1 and 2, to provide a clearer picture of cooperation therebetween. In an actual service installation, brick which are cased by the apparatus of this invention are subsequently passed to a welding machine, wherein the case sections are permanently affixed to each other about an enclosed brick. It is preferable that the operation of this welding apparatus initiate operation of the casing system. In FIG. 8, power line 150 connects the brick case welder (not shown in the drawings) and the electrical control system of the casing apparatus. The welding machine operates to close the limit switch 151 across line 150. The pusher and empty case transfer cylinders 120 and 61, respectively (FIG. 9), are actuated by the closing of limit switch 151. These cylinders, respectively, cause transfer of a cased brick from the casing station 14 onto the discharge conveyor 200, and transfer of an empty case from case magazine 60 to the casing station.

As an empty case reaches the casing station, a limit switch 152 located adjacent the case transfer cylinder 61 causes the magnetic cylinder 57, to lower the magnetic member 50 where it can clamp on the top half of the empty case C. When the magnetic cylinder is fully extended, it actuates limit switch 153 which, in turn, causes the cylinder 57 to move magnet 50 to its original position, taking the top half of the case with it. Limit switch 153 also actuates cylinder 54 and cylinder 41 which cause, respectively, the fingers 55 to be inserted within the opened case, and for a brick to be pushed down the guide runners 44 into the empty case.

When a brick is partially pushed into an empty case, the limit switch 155 is actuated causing the return of the fingers 55 to their original position. When the cylinder 41 completes its forward stroke, limit switch 156 is actuated causing the cylinder 41 to withdraw its pad 43, and also to cause the cylinders 52 and 53 to extend their rods 114 and 115 to thereby strip the top half of the case away from the magnet 50 and close the metal case about the brick.

Shortly before completion of the return stroke of the cylinder 41, limit switch 157 is tripped to cause cylinder 35 to transfer a new brick to the load station 12. The diagram of FIG. 9, of course, shows switch 159 (discussed below) must be closed. The cylinder 35 is returned to its original position by actuation of the limit switch 161. When the cylinder 35 returns to its original position, it trips limit switch 158, which causes brick clamp cylinder 30 to release its hold on the line of bricks on brick conveyor 20. Thus, the entire line of brick moves forward until contact is made with limit switch 150, which causes the brick clamp cylinder 30 to clamp on the second brick of the remaining line of brick to stop their progress.

When stripping cylinder 53 has completed its downward stroke to close the metal case, it trips limit switch 160, to cause return of the stripping cylinders to their retracted position. The foregoing completes the cycle of the casing apparatus, and everything remains at rest until the welding machine or some other indexing device commands the removal of the cased brick from the casing station 14 and initiates another cycle.

There are certain safety arrangements included in the foregoing control system. For example, limit switch 162 must be actuated by a case in position thereon before the casing cycle may begin. Similarly, limit switches 163 and 164 must indicate removal of a previously cased brick from the casing station 14 before the next casing cycle may be completed. In FIG. 8 we have schematically indicated the various solenoid-operated valves, which control the flow of fluid to the various cylinders by the abbreviation "SOL" in a circle. The letters "CR" indicate electrical control relays.

Figure 10:
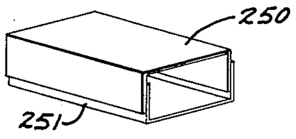
FIG. 10 is an alternative type of case which can be used with the apparatus of this invention.

FIG. 10 shows an alternative empty case arrangement which can be used. This case is comprised of two identically dimensioned sections 250 and 251, rather than the male and female section type case of FIGS. 7A through 7F.

Having thus described our invention in detail and with sufficient particularity as to enable those skilled in the art to practice it, what we desired to have protected by Letters Patent is set forth in the following claims:

We claim:

1. Apparatus for continuously applying sheet metal casing about refractory shapes or brick, including brick supply means, first means cooperatively interconnecting the brick supply means and a brick casing station, said first means including second means arranged to pass a brick from the brick supply means to the brick casing station, a brick casing station and a sheet metal casing supply station, third means cooperatively interconnecting the sheet metal casing supply station and the brick casing station, said third means including fourth means arranged to guide sheet metal casing from the sheet metal casing supply station to the brick casing station, said brick casing station including fifth means arranged to maintain sheet metal casing in position and in a condition for receiving brick moved by the second means, the casing station including sixth means arranged to close sheet metal casing about a contained brick, an integrated control system interconnecting the second, fifth, and sixth means, including actuating means arranged to program and command the sequence of operation of the second, fifth, and sixth means whereby sheet metal casing is positioned about brick moved to said casing station under the influence of the second means and then closed about the brick.

2. The apparatus of claim 1 in which the first means and the third means are in part segments of a common supporting surface for the brick supply station, the brick casing station, and the sheet metal casing supply station.

3. The apparatus of claim 1 in which the sheet metal casing supply station holds a plurality of mated pairs of opposed U-shaped channels in stacked relation.

4. The apparatus of claim 3 in which the brick supply means includes pusher means arranged to remove the first of a series of aligned brick and to pass this first brick to the second means, said integrated control system actuating means also arranged to command and program the operation of the pusher means.

5. Apparatus for continuously applying sheet metal casing about refractory shapes or brick, including brick supply means, first means cooperatively interconnecting the brick supply means and a brick casing station, said first means including second means arranged to pass a brick from the brick supply means to the brick casing station, a brick casing station and a sheet metal casing supply station, third means cooperatively interconnecting the sheet metal casing supply station and the brick casing station, said third means including fourth means arranged to guide sheet metal casing from the sheet metal casing supply station to the brick casing station, said brick casing station including fifth means arranged to maintain sheet metal casing in position and in a condition for receiving brick moved by the second means, the casing station including sixth means arranged to close sheet metal casing about a contained brick, seventh means cooperatively interconnected wtih the brick casing station arranged to remove a cased brick from the casing station to a remote discharge position, an integrated control system interconnecting the second, fifth, sixth and seventh means, including actuating means arranged to program and command the sequence of operation of the second, fifth, sixth and seventh means whereby sheet metal casing is positioned about brick moved to said casing station under the influence of the second means, then closed about the brick and the cased brick removed from the brick casing station.

6. Apparatus for continuously applying sheet metal casing about refractory shapes or brick, including brick supply means, first means cooperatively interconnecting the brick supply means and a brick casing station, said first means including second means arranged to pass a brick from the brick supply means to the brick casing station, a brick casing station, a casing supply station arranged to store a plurality of mater pairs of U shaped metal channels, third means cooperatively interconnecting the casing supply station and the brick casing station, said third means including fourth means arranged to remove and guide single pairs of U-shaped channels from the casing supply station to the brick casing station, said brick casing station including fifth means arranged to fix a pair of channels in position and to place them in condition for receiving brick between the channels, the casing station including sixth means arranged to close the channels about a contained brick to form a cased brick, seventh means cooperatively interconnected with the brick casing station arranged to remove a cased brick from the casing station to a remote discharge position, an integrated control system interconnecting the second, fifth, sixth and seventh means, including actuating means arranged to program and command operation of the second, fifth, sixth and seventh means whereby a mated pair of U-shaped channels is in position and in condition at the brick casing station for receiving brick moved to said casing station under the influence of the second means and to close a pair of channels about a brick and to then remove a cased brick from the brick casing station.

7. Apparatus for continuously applying a pair of U-shaped sheet metal cases about a brick, including a brick supply station, first means cooperatively interconnecting a brick supply station and a brick casing station, said first means including second means arranged to pass a brick from the brick supply station to a juxtaposed casing station, a casing station and a case supply station arranged to store a plurality of pairs of U-shaped cases, third means cooperatively interconnecting the case supply station and the brick casing station, said third means including fourth means arranged to move pairs of the U-shaped cases from the case supply station to the brick casing station, said brick casing station including fifth means arranged to prepare a pair of U-shaped cases to receive brick, the casing station including sixth means arranged to guide brick between a pair of U-shaped cases, seventh means arranged to close a pair of U-shaped cases about a contained and centered brick, eighth means cooperatively interconnected with the brick casing station arranged to remove a cased brick from the casing station to a remote discharge position, an integrated control system including first actuating means arranged to program and command a casing cycle including the sequential operation of the second, fourth, fifth, sixth, seventh and eighth means whereby sheet metal casing is positioned about a brick moving to said casing station under the influence of the second means and to thereafter close the sheet metal casing about a brick and to then remove a cased brick from the brick casing station.

8. The apparatus of claim 7 in which the operation of the eighth means in removing a cased brick from the casing station causes the control system to initiate a new casing cycle.

9. Apparatus for continuously applying a pair of channel shaped sheet metal case sections about a brick, a pair of said case sections comprising an empty case, including a brick supply station, said brick supply station including first means arranged to continuously remove the first from a series of brick and pass it to a juxtaposed brick load station, first guide means cooperatively interconnecting the brick supply station and the brick load station arranged to guide said first brick from said first means to the brick load station, a brick load station, second means at said brick load station arranged to pass a brick therefrom to a juxtaposed casing station, second guide means cooperatively interconnecting the brick load station and the casing station arranged to guide said first brick from said second means, a casing station and an empty case supply and feed station adjacent said casing station, third means at said case supply and feed station arranged to remove the first from a series of empty cases, third guide means cooperatively interconnecting the casing station and the case supply and feed station arranged to guide an empty case from said case supply and feed station to said casing station, fourth means at said casing station arranged to open a case therein, fifth means at said casing station arranged to guide a brick from said second guide means into an open case, sixth means at the casing station arranged to close a case about a contained brick, pusher means, said pusher means arranged to reciprocally travel from a first position between the casing feed and supply station and said casing station to a second position remote from said casing station and to remove a cased brick from said casing station in its travel from said first position, and integrated control means arranged to sequentially and automatically control the operation of the apparatus to place empty cases about brick.

10. Apparatus for continuously applying a pair of channel shaped sheet metal case sections about a brick, a pair of said case sections comprising an empty case, including a brick supply station, said brick supply station including first means arranged to continuously remove the first from a series of brick and pass it to a juxtaposed brick load station, first guide means cooperatively interconnecting the brick supply station and the brick load station arranged to guide said first brick from said first means to the brick load station, a brick load station, second means at said brick load station arranged to pass a brick therefrom to a juxtaposed casing station, second guide means cooperatively interconnecting the brick load station and the casing station arranged to guide said first brick from said second means, a casing station and an empty case supply and feed station adjacent said casing station, third means at said case supply and feed station arranged to remove the first from a series of empty cases, third guide means cooperatively interconnecting the casing station and the case supply and feed station arranged to guide an empty case from said case supply and feed station to said casing station, fourth means at said casing station arranged to open a case therein, fifth means at said casing station movable into contact with the inner surfaces of the lips of an open case to guide a brick from said second guide means into an open case without impedance to its travel, sixth means at the casing station arranged to close a case about a contained brick, pusher means, said pusher means arranged to reciprocally travel from a first position between the casing feed and supply station and said casing station to a second position remote from said casing station and to remove a cased brick from said casing station in its travel from said first position, and integrated control means arranged to sequentially and automatically control the operation of the apparatus to place empty cases about brick.

11. The apparatus of claim 10 in which the first, second and third means are hydraulic cylinder and piston rod arrangements in which an elongate pusher pad is releasably mounted on the forward end of the piston rods.

12. The apparatus of claim 10 in which the sixth means includes a pair of inwardly bent flexible metal fingers mounted on a reciprocally movable yoke assembly in position to straddle brick moving into an empty case, the fingers being bent inwardly only sufficient to fit within the adjacent mouth of an empty case.

13. The apparatus of claim 12 in which the operation of the second means initiates and stops the reciprocal travel of the yoke assembly.

14. In apparatus of type described, the combination with support means supporting mated pairs of opposed U-shaped metal channels, support means for refractory articles, and a casing station, of common means for moving both mated pairs of metal channels and refractory articles to a casing station and for placing a pair of channels about a refractory article at said casing station.

15. In apparatus of the type described, the combination with first support means supporting mated pairs of opposed U-shaped metal channel, second support means for refractory articles, and a casing station, the first support means, second support means and casing station all mounted on a common table, of common means for moving both mated pairs of metal channels and refractory articles to a casing station and for placing a pair of channels about a refractory article at said casing station.

16. In apparatus of the type described, the combination with support means supporting mated pairs of opposed U-shaped metal channels, support means for refractory articles, and a casing station, of common means for simultaneously moving both mated pairs of metal channels and refractory articles to a casing station and for placing a pair of channels about a refractory article at said casing station.

17. In combination with a brick press and a casing welder, apparatus of the type described, including support means supporting mated pairs of opposed U-shaped metal channels, support means for refractory articles, a casing station, means for conveying brick from the brick press to the casing station, and means for conveying cased brick from the casing station to the welder, of common means for moving both mated pairs of metal channels and refractory articles to a casing station and for placing a pair of channels about a refractory article at said casing station.

18. In combination with a brick press, apparatus of the type described, including support means supporting mated pairs of opposed U-shaped metal channels, support means for refractory articles, a casing station, and means for conveying brick from the brick press to the casing station, of common means for moving both mated pairs of metal channels and refractory articles to a casing station and for placing a pair of channels about a refractory article at said casing station.

19. In combination with a case welder, apparatus of the type described, including support means supporting mated pairs of opposed U-shaped metal channels, support means for refractory articles, a casing station, and means for moving cased brick from the casing station to the welder, of common means for moving both mated pairs of metal channels and refractory articles to a casing station and for placing a pair of channels about a refractory article at said casing station.

20. In apparatus of the type described, the combination with support means supporting mated pairs of opposed identical U-shaped metal channels, support means for refractory articles, and a casing station, of common means for moving both mated pairs of metal channels and refractory articles to a casing station and for placing a pair of channels about a refractory article at said casing station.

References Cited in the file of this patent

UNITED STATES PATENTS

| | | |
|---|---|---|
| 2,457,766 | Young | Dec. 28, 1948 |
| 2,803,870 | Uphoff | Aug. 27, 1957 |
| 2,993,265 | Bernhard et al. | July 25, 1961 |